United States Patent [19]

Gyugyi et al.

[11] 3,876,888

[45] Apr. 8, 1975

[54] SINE WAVE REFERENCE WAVEFORM GENERATOR

[75] Inventors: Laszlo Gyugyi; Eric J. Stacey, both of Penn Hills, Pa.

[73] Assignee: Westinghouse Electric Corporation, Pittsburgh, Pa.

[22] Filed: Mar. 15, 1973

[21] Appl. No.: 341,642

[52] U.S. Cl. .................... 307/261; 328/13; 328/14; 328/27

[51] Int. Cl. .............................................. H03k 5/00

[58] Field of Search ........ 307/260, 261; 328/13, 14, 328/22, 27

[56] References Cited

UNITED STATES PATENTS

| | | | |
|---|---|---|---|
| 3,215,860 | 11/1965 | Neumann | 328/27 X |
| 3,512,092 | 5/1970 | Thurnell | 328/14 |

*Primary Examiner*—John Zazworsky

*Attorney, Agent, or Firm*—G. H. Telfer

[57] ABSTRACT

An operational amplifier is used to synthesize a sine wave from a plurality of phase displaced rectangular waveforms of magnitude selected for minimum distortion. The rectangular waveforms are applied to the inverting (summing) input terminal of the operational amplifier while the non-inverting input terminal is maintained at a direct voltage resulting in an output of the synthesized rectangular waveforms that is symmetrical about the voltage level of the non-inverting input terminal. Application of this waveform to a simple first order filter, such as an integrator provided by a feedback network on the same opamp, results in a smooth sine wave of high precision suitable for various applications such as in cycloconverters.

8 Claims, 7 Drawing Figures

SINE WAVE REFERENCE WAVEFORM GENERATOR

BACKGROUND OF THE INVENTION

Electrical power obtained from a variable speed generator has a variable frequency. It is known that such power can be converted to constant frequency, high quality, alternating current power by the use of a static cycloconverter. Systems for doing so are sometimes called Variable Speed Constant Frequency or VSCF power generating systems. FIG. 1 gives a schematic block diagram of such a system. A cycloconverter 10 is the heart of the system and acts essentially as a power amplifier. It basically comprises a plurality of power switches fired at relatively precise points in time by a control unit 12 which in turn is supplied by a reference waveform from a reference generator. A generator 16 supplies its variable frequency output to the cycloconverter 10. The sketch of FIG. 1 contemplates a three-phase system although other numbers and phases may be used.

From this general description of previously known subject matter, it can be seen that the reference generator 14 essentially controls the character of the output of the cycloconverter. While the power level of the signal produced by the reference generator may be relatively low, its quality is very important because the static cycloconverter, being in effect a power amplifier, will essentially reproduce the reference wave at its output. Thus, any distortion, or unbalance in the reference waves may be reproduced in the output waveforms of the cycloconverter.

The reference generator may also be used to reduce the output voltage unbalance in certain applications, e.g., airborne VSCF systems, where unbalanced loads cause unbalance in the output voltages because of the finite output impedance of practical cycloconverters. This is normally achieved by "closed loop" controlling the amplitude of each reference wave from the corresponding output of the cycloconverter, i.e., the amplitude of each cycloconverter output voltage is compared to a voltage reference and the error signal is used to control the amplitude of the reference wave. For example, if the output voltage is too high, the error signal causes the amplitude or the reference wave to be decreased, which then causes the cycloconverter output voltage to be reduced.

In prior known systems, the reference generator has been a low power inverter circuit with harmonic neutralization. This technique was originally developed for relatively high power dc to ac power conversion, and could not be adopted for low power applications without considerable disadvantages such as bulky size, relatively high weight, large number of components and high cost. For example, the basic reference generator used in a VSCF system sought to be improved by the present invention is disclosed in FIG. 2 hereof and comprises in total, for three phases, 15 transformers, 30 transistors, 30 diodes, 60 resistors and a six-stage digital counter. Only the circuitry for a single phase is shown in FIG. 2. This known type of reference generator has been successfully used and will not be further detailed here. Further information with respect to this type of inverter circuit may be had by reference to U.S. Pat. No. 3,491,282, ""Static Inverter Wherein a Plurality of Square Waves are so Summed as to Produce a Sinusoidal Output Wave" by T. M. Heinrich et al, Jan. 20, 1970.

SUMMARY OF THE INVENTION

The present invention came about in an effort to reduce the size, weight and cost of conventional sine wave reference generators without, however, any sacrifice in the quality of the waveform produced.

While the present invention came about in connection with a need for an improved reference generator for a VSCF power generating system, it will be understood that the reference generator disclosed herein could also be used in other applications where precise multiphase and/or low frequency sine wave signals are required. Merely an example of such other applications is a pulse-width modulated d.c. to a.c. power inverter, the output of which is also controlled from a low power reference wave generator.

In accordance with the present invention, an amplifier (preferably an amplifier having a low input impedance such as that commonly referred to as an operational amplifier) is used to synthesize a sine wave from a plurality of phase displaced rectangular waveforms of magnitudes selected for minimum distortion. The rectangular waveforms are applied to the inverting input terminal of the operational amplifier while the non-inverting input terminal is maintained at a direct voltage resulting in a composite output of the synthesized rectangular waveforms that is symmetrical about the voltage level of the non-inverting input terminal. Application of this waveform to a simple single pole filter, such as an integrator, results in a smooth sine wave of high precision suitable for various applications such as in cycloconverters. The referred to integrator function is readily provided since the opamp doing the summing, when provided with a feedback capacitor, also will be an integrator and provide a smooth output.

The reference generator of this invention utilizes the basic principles of harmonic neutralization taught by U.S. Pat. No. 3,491,282, but does so in a manner different from the conventional inverter that uses several transformers, thus resulting in considerable simplification and cost reduction. Particular advantage in the present invention is taken of the summing property of an operational amplifier. A relatively simple resistive network with associated switches, preferably low power semiconductor devices, that respond to the output of a ring counter circuit and cooperate to produce the individual phase displaced rectangular waveforms supplied to the operational amplifier.

The reference generator of this invention has been successfully tested in a VSCF power generating system with three output phases. In contrast to the above-referred to conventional inverter of FIG. 2, this system requires only the use of 30 resistors, 15 transistor switches and three operational amplifiers for all three phases.

PREFERRED EMBODIMENTS

Figure 3:
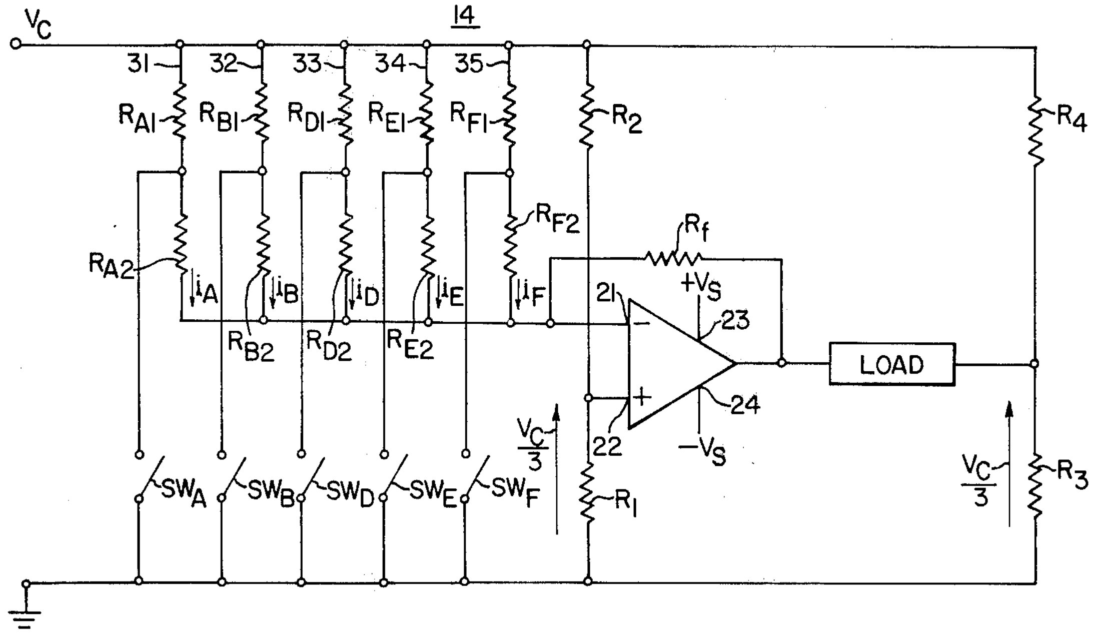
FIG. 3 is a circuit diagram of a generalized embodiment of the present invention for one phase.

Referring to FIG. 3, there is shown a basic form of a reference generator 14 in accordance with this invention that utilizes the summing property of an operational amplifier 20 to combine various rectangular wave currents to synthesize the desired sinusoidal waveform. In the context of this invention, it will be understood that the waveforms referred to as rectangular are of a nature sometimes referred to as "square" waveforms.

The circuit uses an operational amplifier 20 that may be of conventional commercially available form. It is known that operational amplifiers may be provided in various ways utilizing discrete components.

The summing amplifier used in the invention is not necessarily what has become known in the trade as an "operational" amplifier although that form is preferred. The quantities of an amplifier that make it most suitable for the present purpose are its lack of distortion, i.e., the output wave shape is very close to that of the input, and its low input impedance, i.e., so current source impedances from which signals are supplied to the amplifier can be small. For greatest simplicity and economy, it is preferred to employ a commercially available operational amplifier (or "opamp") in integrated circuit form. Hence, the operational amplifier will be treated as a single component and further information with respect to the nature thereof may be obtained by reference to manufacturers (such as Fairchild and Motorola) data sheets or such well known integrated operational amplifiers which are commonly referred to by numbers 709 and 741. The following description will refer particularly to preferred embodiments using such opamps.

The operational amplifier 20 is characterized by having two input terminals 21 and 22. A first input terminal 21, also designated by a minus sign in the drawing, is a summing terminal to which signals are applied that are inverted in polarity by the known functioning of the operational amplifier. A second of the operational amplifier input terminals 22, also designated by a plus sign in the drawing, is one at which applied signals are operated upon by the operational amplifier 20 without polarity inversion. The opamp 20 also has bias terminals 23 and 24 to which positive and negative supply voltages, + and $-V_s$, are respectively applied as is known in opamp operation.

It is known, such as by reference to above-mentioned U.S. Pat. No. 3,491,282, that a number, N, of square waves, either voltage or current, can be combined to synthesize a waveform $q_r$ that approximates a sine wave voltage or current $q_{rF}$ so long as the following relationships are satisfied in order to obtain minimum distortion:

$$M_{Xr} = K\cos(\phi_X - \phi_r) \quad (1)$$

$$\text{and} \quad K = \frac{\pi q_{rF}}{\sqrt{2}\,N} \quad (2)$$

where $M_{Xr}$ = magnitude of an individual square wave, X, contributed to the resultant wave $q_r$, $\phi_X$ = angular position of square wave X, $\phi_r$ = angular position of the resultant wave $q_r$, and qrF = the r.m.s. value of the sine wave approximated In the present invention $q_r$ is a synthesized current waveform that is applied to the inverting input of the operational amplifier. The operational amplifier will, in response to this input current, produce a similar voltage waveform at its output, which is applied to the cycloconverter as the reference wave.

Assuming, as customary, that output phase 1 of the cycloconverter has zero phase angle (which requires that the phase angle of the corresponding snythesized waveform, $\phi_r$, be also zero), and arbitrarily choosing N to be equal to six, (it being the case that N may be more or less than six, however, a higher quality waveform will be produced with larger N, although some additional circuit complexity is incurred and the number 6 is suitable for most purposes as it provides cancellation up through the ninth harmonic the required magnitudes of the 6 rectangular waves $M_{1r}$ through $M_{6r}$, which being current waves will hereafter be designated as $i_A$ through $i_F$, are phase displaced by 180°/N or 30°, and can be calculated to be $$\begin{aligned} i_A &= 0.866K \\ i_B &= 0.5K \\ i_C &= 0 \\ i_D &= -0.5K \\ i_E &= -0.866K \\ i_F &= -K \end{aligned} \quad (3)$$

where K is defined by equation (2) with $q_{rF}$ being the input current to the operational amplifier needed to produce the reference voltage with the required magnitude.

In order to make the amplitude of the reference wave controllable, the various rectangular wave currents are derived from a direct voltage $V_C$ applied to the input of the circuit 14. Appropriately chosen resistors are provided to develop the individual currents from voltage $V_c$ and feed them to the summing input 21 of the operational amplifier 20. Since one of the currents is zero, it is merely necessary that five currents be developed by the resistive networks connected to the summing input. The current source resistors comprise two in each branch 31, 32, 33, 34 and 35, which, in this example, are equal to each other, i.e., $R_{A1} = R_{A2}$, $R_{B1} = R_{B2}$, . . . $R_{F1} = R_{F2}$. The equality of resistors in each of the branches is preferred for convenience but is not essential. What is important is that the resistors in each branch have the same ration, i.e., $$\frac{R_{A1}}{R_{A2}} = \frac{R_{B1}}{R_{B2}} \ldots = \frac{R_{F1}}{R_{F2}}$$

The resistors in the different branches 31 through 35 are also related to each other in magnitude in accordance with the appropriate scaling factor K, defined by equation 2, as indicated by the set of equation 3). That is, if $R_{F1}$ has a magnitude of unity, $R_{A1} = 1.15$ since current $i_A$ has a magnitude only 0.866 of that of $i_F$.

As shown in FIG. 3, the non-inverting input 22 of the amplifier 20 is connected to the junction of a potential divider comprising resistors $R_1$ and $R_2$ where $R_2$ equals $2 \times R_1$. Therefore, this input is tied to a substantially constant direct voltage $V_C/3$. The potential at the non-inverting input 22 also sets the potential level of the inverting input 21, 22 essentially to $V_C/3$, as is the case in operational amplifiers. The reason for choosing the value $V_C/3$ is to provide the same but opposite polarity rectangular current waves to the summing point of the amplifier when synthesizing the positive and negative half cycles of the waveform. To clarify this, consider for example, resistor branch 31. When $SW_A$ is open the total resistor in that branch is $R_{A1} + R_{A2} = 2R_{A1}$. The voltage between the summing point and $V_C$ is positive and equal to $V_C - ⅓ V_C = ⅔ V_C$. The current is positive and equal to $i_A = 2/3\ V_C/2R_{A1} = 1/3\ V_C/R_{A1}$. When $SW_A$ is closed, $R_{A2}(= R_{A1})$ is connected to the ground which is negative with respect to the summing point and equal to $-V_C/3$. Thus the current $i_A$ supplied is $i_A = ⅓\ V_C/R_{A1}$, same as before but negative.

Where $R_{A1}$ is not equal to $R_{A2}$, another choice of $R_1$ and $R_2$ is indicated. For example, if $R_{A1} = 2R_{A2}$ then it can be shown that to achieve the desired symmetry $R_2$ should equal $4R_1$.

As shown in FIG. 3, switches $SW_A$, $SW_B$, $SW_D$, $SW_E$, and $SW_F$ are respectively connected between the pair of resistors $R_{A1}$, $R_{A2}$, etc., in each current source branch, 31 etc., and the grounded input terminal of the circuit. These switches are sequentially controlled in accordance with the required output waveform in a manner similar to that employed in prior reference generators, such as that of FIG. 2. If we assume that switch $SW_A$ is open, and assuming that $V_C$ is negative, the current to the amplifier through the first circuit branch 31 is negative with the following magnitude:

$$i_A(SW_A\ \text{open}) = -\left[\frac{V_C - V_C/3}{2R_{A1}}\right] = -\frac{V_C}{3R_{A1}}$$

When $SW_A$ is closed, this current is positive and has the following magnitude:

$$i_A\ (SW_A\ \text{closed}) = \frac{V_C}{3R_{A1}}$$

Thus, if each of the resistors is proportional to the appropriate scaling factors given by the above equations and the switches are operated with the repetition frequency of the synthesized wave, and with an equal ON/OFF interval so that the conduction intervals of each consecutive switch are shifted by the necessary one-sixth of this interval, or 30°, then, it is seen that rectangular waveform currents having 30° phase displacement therebetween are applied to the summing input of the amplifier.

Figure 1:
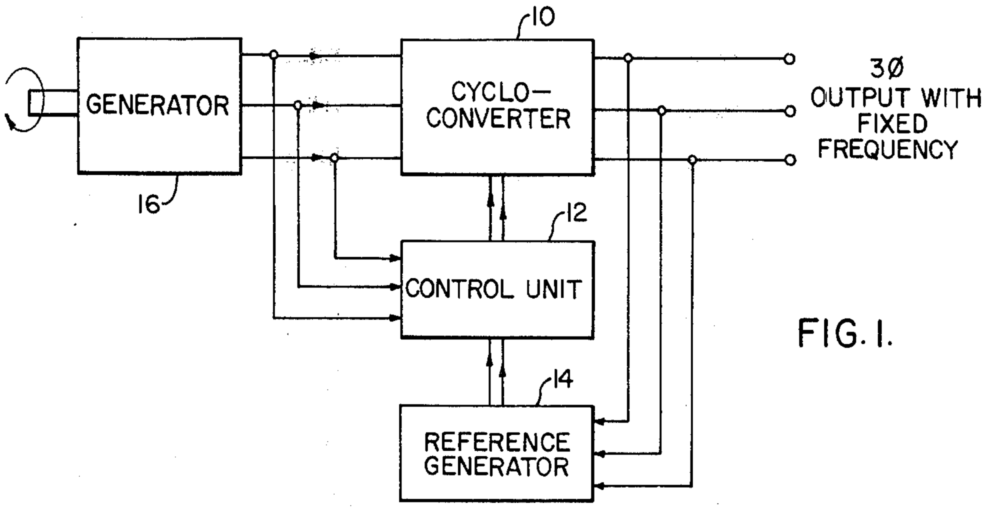
FIG. 1 is a schematic diagram in block form of a VSCF power generating system presented by way of background and discussed hereinbefore.
Figure 4:
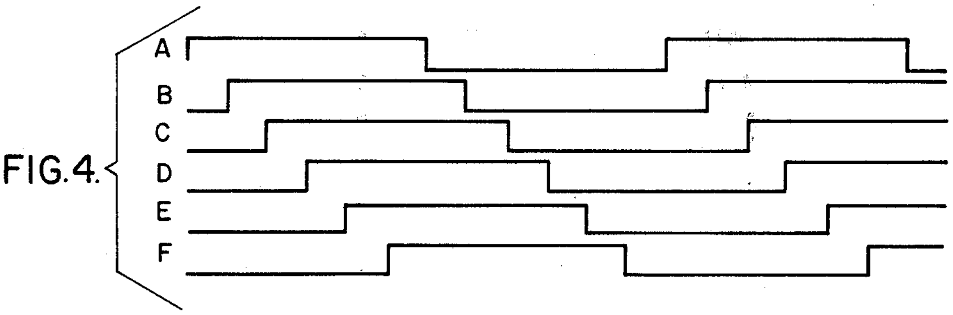
FIGS. 4 and 5 show waveforms useful in understanding the operation of the circuit of FIG. 3.
Figure 5:
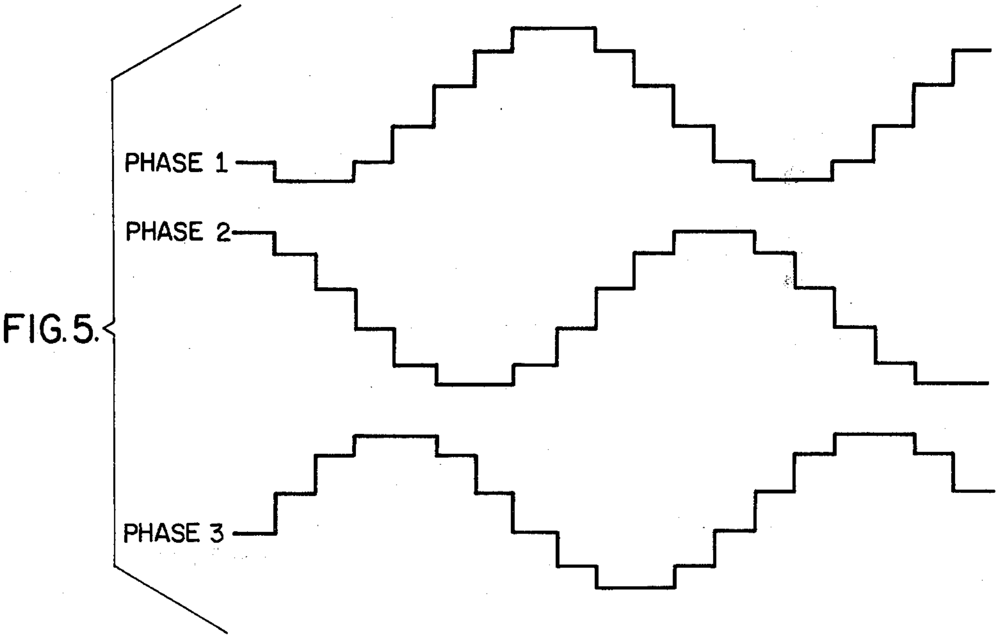

FIG. 4 shows the required waveforms A through F for $i_A$ through $i_F$. Waveform C of FIG. 4 would not be developed by the FIG. 3 circuit but it would be required in the other two circuits for the other two phases, where one of the other currents would be zero. The combined waveforms of FIG. 4 are illustrated in FIG. 5. The phase 1 waveform of FIG. 5 is achieved by adding waveforms A, B, D, E and F of FIG. 5. Phase 2 is a combination of waveforms B, C, D, E, and F. Phase 3 is a combination of waveforms A, B, C, D, and F. The output waveform of the amplifier can be expressed by $$V_{OUT} = -R_f\,(i_A + i_B + i_D + i_E + i_F)$$

where $R_f$ is the feedback resistance of the amplifier. This output waveform is symmetrical about $V_C/3$.

A load is connected between the output of the amplifier and the junction of resistors $R_3$ and $R_4$, where $R_4$ equals $2R_3$. The purpose of voltage divider $R_3/R_4$ is to avoid direct current component in the load. The load may be applied through an isolation transformer (not shown in FIG. 3) the primary of which is connected between the output of the operational amplifier and the junction of $R_3$ and $R_4$, and the load is connected to the secondary. This arrangement makes it possible to ground one end of the load without having dc current flowing in it.

The extreme simplicity of the circuit of this invention is due principally to the arrangement whereby the input and output direct current potential levels of the amplifier vary in proportion to the control voltage $V_C$. This provides a sort of automatic biasing that allows the use of a single polarity control voltage and a minimum number of switches.

Figure 6:
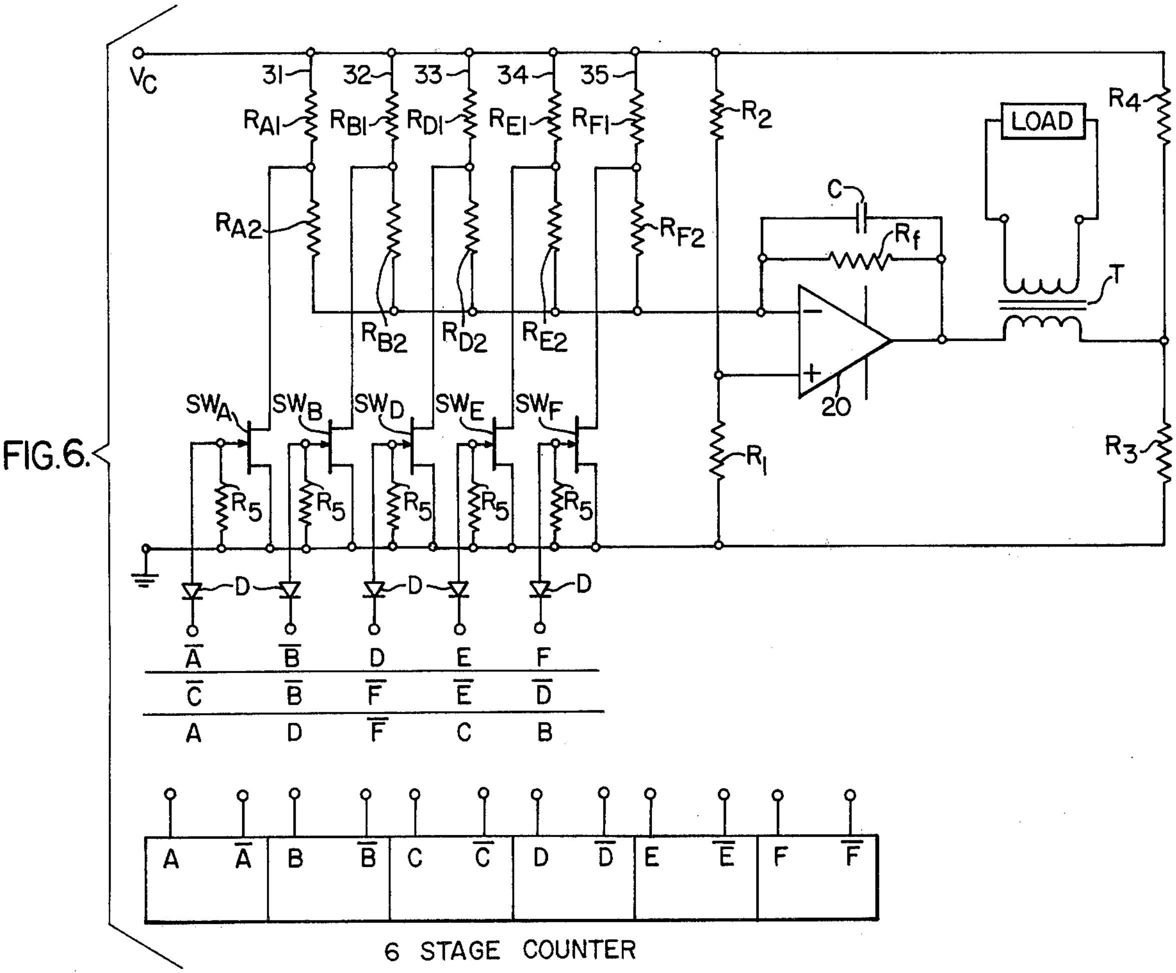
FIG. 6 is a circuit diagram of a more specific embodiment of the present invention for one phase.
Figure 7:
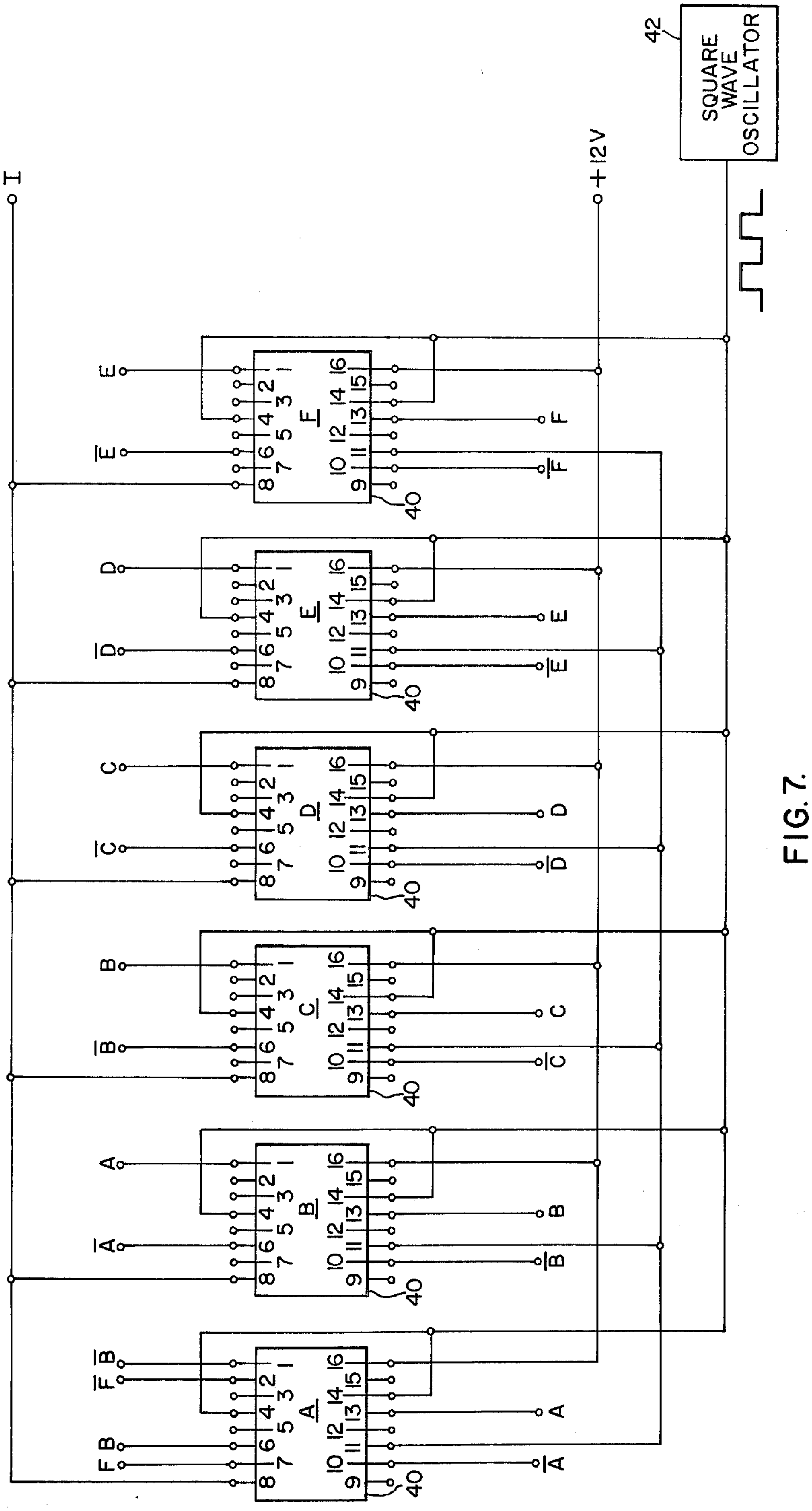
FIG. 7 is a circuit diagram of an example of a six-stage ring counter suitable for use in the circuit of FIG. 6.

A more specific embodiment of the present invention is shown in FIG. 6. Basically FIG. 6 is in the same form as the circuit of FIG. 3 and like reference numerals are used where appropriate. It is shown that the switches $SW_A$–$SW_F$ are selected to be field effect transistors (FET's) with their gates connected to ground through individual resistors $R_5$ and also connected to a six-stage ring counter, producing square wave switching signals illustrated in FIG. 4, that may be of known configuration, through individual diodes D. In FIG. 6, as well as FIG. 3, the circuitry pertaining to a single phase is illustrated. At the gate inputs of the switches are indicated the appropriate signal connections from the ring counter for each of the three phases so that one six-stage ring counter suitably controls three reference generator phase circuits for all three phases as illustrated. Merely for purposes of example, FIG. 7, illustrates a suitable ring counter using a plurality of commercially available flip-flop integrated circuits 40. Square wave oscillator 42 of conventional design should produce a frequency of $12\,f_o$ where $f_o$ is the frequency of the synthesized wave.

Because of a positive control voltage $V_C$ used in the more specific embodiment of FIG. 6, the complements of the square waves specified in the previous discussion in connection with FIG. 3 are utilized, although there is no difference in principle. Due to the harmonic cancellation, the lowest harmonic present in the output waveform is the eleventh, which can easily be reduced to the required magnitude by filtering with small size components. A further advantage of the described system is that this filter can be very simple. By adding a capacitor C across the feedback resistor $R_f$ of the amplifier, the amplifier 20 itself becomes an integrator at high frequencies, which results in a progressive reduction of the harmonic amplitudes so that further filtering of the output waveform is not necessary. The load is connected to isolation transformer T. Therefore, the described circuit provides a high quality sinusoidal output with an amplitude directly proportional to the control voltage $V_C$.

A further interesting property of this circuit is that the polarity of the alternating current output voltage can be reversed by inverting the polarity of the direct current control voltage $V_C$.

Figure 2:
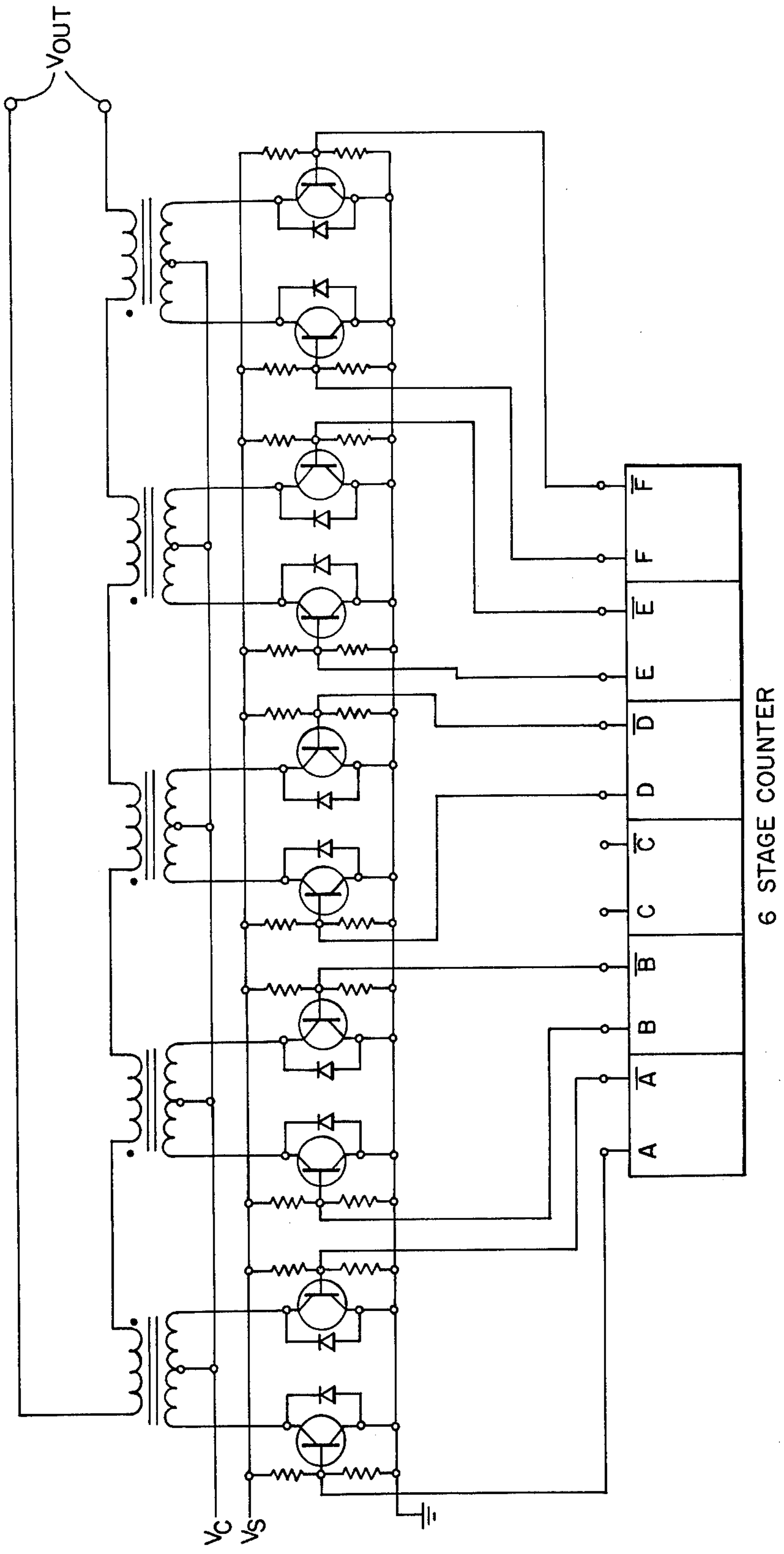
PRIOR ART FIG. 2.
FIG. 2 is a circuit schematic for one phase of a reference generator in accordance with the prior art and referred to hereinbefore.

As compared with the prior circuit illustrated in FIG. 2, the circuit of FIG. 6 in accordance with this invention allows a weight reduction of at least 30 to 1, a size reduction of about 5 to 1 and a cost reduction of about 4 to 1.

The proposed circuit can also be utilized in applications which require single or multiphase sinusoidal reference signals with variable frequency and voltage. Such an application is the variable speed control of A.C. motors, where variable frequency variable voltage output is produced by a static cycloconverter or inverter, which is applied to the motor. As was previously explained, these static systems function essentially as power amplifiers, therefore their output is controlled by low power, variable frequency-variable voltage signals obtained from a reference generator.

Merely by way of further example, the following table presents a listing of suitable components and parameters that have been successfully employed in one embodiment of the present invention, in accordance with FIGS. 6 and 7:

| | |
|---|---|
| Operational amplifier 20 | Type 709 |
| $R_{A1}$ and $R_{A2}$ | 10 K.ohms |
| $R_{B1}$, $R_{B2}$, $R_{F1}$ and $R_{F2}$ | 11.5 K.ohms |
| $R_{D1}$, $R_{D2}$, $R_{E1}$, and $R_{E2}$ | 20 K. ohms |
| $R_1$ | 7.5 K.ohms |
| $R_2$ | 15 K.ohms |
| $R_3$ | 1.K.ohms |
| $R_4$ | 2 K.ohms |
| $R_5$ | 20 K.ohms |
| $SW_A$, $SW_B$, $SW_D$, $SW_E$, and $SW_F$ | 2N4393 |
| D | MPD400 |
| $R_f$ | 5.1 K.ohms |
| C | 0.12 micro F. |
| T | Triad 322-8P-S2 |
| flip-flops 40 | Amelco 311 |

What is claimed is:

1. Apparatus for generating a sinusoidal voltage waveform comprising: an operational amplifier having first and second input terminals and an output terminal, said first input terminal being a signal polarity inverting terminal and said second input terminal being a signal polarity non-inverting terminal; means for applying to said first terminal a plurality of currents having mutual uniformly phase displaced, substantially symmetrical rectangular waveforms wherein the phase displacement of said current waveforms is substantially equal to 180°/N where N is an integer representing the number of said waveforms; means for maintaining at said second terminal a direct voltage to provide at said output terminal an output voltage having a waveform that is a combination of said rectangular current waveforms and is symmetrical about a voltage level substantially equal to that maintained at said second terminal.

2. The subject matter of claim 1 further comprising: a load coupled to said output terminal with isolation means, to remove direct current components from said output voltage waveform.

3. The subject matter of claim 1 where the said operational amplifier has a feedback capacitor connected between said output terminal and said first input terminal to provide integrator functions removing remaining harmonic components from said output voltage waveform.

4. The subject matter of claim 1 wherein: said means for applying a pluraltiy of currents to said first terminal comprises a direct voltage source connected through a plurality of circuit branches to said terminal; each said circuit branch comprising a pair of resistors having a midpoint therebetween; said pair of resistors having a resistance ratio to one another that is the same as the ratio of resistors in each of the other of said branches, said resistors in each of said branches having a value scaled in relation to that of the resistors of each other circuit branch to produce currents through said branches for harmonic neutralization of said combined waveform; said resistors in each branch having a midpoint connected to a switching device for each branch, said switches being connected between said midpoints and a ground potential; and means to control sequentially the operation of said switches in accordance with a predetermined pattern.

5. A reference generator for producing a desired time varying voltage waveform comprising: summing means for combining a plurality of individually developed current waveforms that are component parts of the desired waveform; a plurality of current sources for producing said current waveforms, said current sources comprising, for each current waveform to be developed, a circuit branch from a direct voltage source to said summing means, each said circuit branch having therein a pair of series connected resistors with a midpoint therebetween, said pair of resistors having a resistance magnitude ratio that is the same in each said branch, said resistors in an individual branch having a resistance magnitude in relation to said resistors in other branches in accordance with the required mathematical relation of said plurality of current waveforms to produce the desired waveform with minimum harmonics present; control means for each of said circuit branches for selectively forming a current path to ground from each said midpoint for a predetermined interval to produce said rectangular waveforms and to cause said waveforms to be uniformly phase displaced and each of said waveforms to have symmetrical positive and negative portions.

6. The subject matter of claim 5, wherein: said summing means is an amplifier with an input at which said waveforms are applied together and said amplifier has a capacitor connected between its output and said input to provide integrator functions and produce a smooth waveform.

7. The subject matter of claim 5 wherein: the relation of said resistors in said branches is determined by the following equations that determine the required current magnitudes:

$$M_{Xr} = K \cos(\phi_X - \phi_r)$$
$$\text{and } K = \frac{\pi q_{rF}}{\sqrt{2}\,N}$$

where $M_{Xr}$ is the magnitude of an individual component waveform, X, contributed to the resultant wave $q_r$, $\phi_X$ is the angular positive of a wave X, $\phi_r$ is the angular position of the resultant wave $q_r$, $q_{rF}$ is the R.M.S. value of a desired sine wave, N is the number of said plurality of current waveforms, including required to be of zero magnitude.

8. The subject matter of claim 6 wherein: said amplifier is an operational amplifier whose inverting, summing terminal is said input and whose non-inverting input terminal is maintained at a direct voltage about which the output voltage is symmetrical.

* * * * *